United States Patent [19]

Maiocco

[11] 4,427,967

[45] Jan. 24, 1984

[54] ELECTRONIC SIGNALING DEVICE

[75] Inventor: Guiseppe Maiocco, Druento, Italy

[73] Assignee: Arman S.p.A., Druento, Italy

[21] Appl. No.: 283,350

[22] Filed: Jul. 14, 1981

[51] Int. Cl.³ .............................................. B60Q 1/00

[52] U.S. Cl. .................................. 340/52 D; 70/252; 180/287; 200/61.64

[58] Field of Search ...................... 340/52 D, 63, 644; 180/287; 200/61.64; 70/252

[56] References Cited

U.S. PATENT DOCUMENTS

| | | | |
|---|---|---|---|
| 1,458,244 | 6/1923 | Reeves et al. | 70/252 |
| 2,613,258 | 10/1952 | Azano . | |
| 2,742,630 | 4/1956 | Muncheryan . | |
| 2,786,194 | 3/1957 | Hermenzie . | |
| 3,138,780 | 6/1964 | Jacobsen . | |
| 3,256,461 | 6/1966 | Foreman et al. | 340/52 D |
| 3,422,398 | 1/1969 | Rubin | 340/63 |
| 3,569,930 | 3/1971 | Hirama . | |
| 3,629,818 | 12/1971 | Hirama et al. . | |
| 3,641,489 | 2/1972 | Shimomura . | |
| 3,654,600 | 4/1972 | Yamamoto . | |
| 3,723,677 | 3/1973 | Arias . | |
| 3,783,207 | 1/1974 | Schiesterl et al. . | |

FOREIGN PATENT DOCUMENTS

| | | |
|---|---|---|
| 1297385 | 11/1972 | United Kingdom . |
| 1326190 | 8/1973 | United Kingdom . |
| 2065344 | 6/1981 | United Kingdom . |

*Primary Examiner*—David L. Trafton
*Attorney, Agent, or Firm*—John C. Purdue

[57] ABSTRACT

Signaling apparatus for a motor vehicle equipped with a key-operated ignition switch/steering lock assembly is disclosed. The apparatus comprises a first electrical switch movable between open and closed positions upon insertion and removal of the key, a power source such as a battery, an electric circuit comprising a resistor, a diode and a transistor and energized by the power source when the first switch is open, signaling means such as a light or buzzer energizable by the electric circuit, and a second electrical switch which can be operatively associated with a door of the vehicle so that when the second switch is in a closed position because the door is open, the signaling means is operable. Preferably, the first switch comprises a stationary contact and a movable contact; the movable contact can be a lever which is a part in the ignition switch/steering lock.

12 Claims, 10 Drawing Figures

ELECTRONIC SIGNALING DEVICE

BACKGROUND OF THE INVENTION

1. Field of the Invention

The instant invention relates to signaling apparatus. More particularly, the invention relates to such apparatus which is useful in a motor vehicle equipped with both an ignition switch and a locking device, and which is operatively associated with the locking device, especially to warn that a key has been left in the locking device when a door of the vehicle has been opened.

2. Description of the Prior Art

Signaling devices for use in motor vehicles, including ones which provide an audible or visual warning when a door of the vehicle is opened while a key remains in the ignition switch thereof, are well known. Also known are signaling devices which can be operatively associated with steering lock antitheft apparatus for vehicles. Such antitheft apparatus usually includes an ignition switch which must be closed to enable starting of the vehicle engine. Frequently, rotation of a key in such apparatus first disengages a latch from the steering shaft of the vehicle and then closes the ignition switch. Many conventional steering lock/ignition switch devices can be rotated to at least four different angular positions, for example corresponding to STOP, GARAGE, RUN and START. For instance, in the STOP position the ignition key can be inserted and extracted, but the steering shaft remains locked. In the GARAGE position the ignition key can also be inserted and extracted, but the steering shaft remains unlocked. In the RUN and START positions the ignition key can be neither inserted nor extracted and the steering shaft remains unlocked.

U.S. Pat. No. 2,786,194 discloses a signaling device for use with an ignition switch of a motor vehicle. The device is said to provide both a visual and an audible signal whenever the ignition switch is in an "off" position with the key inserted, thereby to provide a reminder that the key is inserted and the switch is in that position.

U.S. Pat. No. 3,569,930 discloses a key-operated antitheft lock for a vehicle steering shaft, and an alarm operable, unless the steering shaft is locked, whenever a door of the vehicle is opened.

U.S. Pat. No. 3,629,818 discloses another antitheft device for a motor vehicle; the device comprises a steering shaft lock and two switches operated by movement of the lock. One of the switches is closed when a door of the vehicle is open and the other is closed when the steering shaft is not locked. An alarm operatively connected through the switches is energized if the door is opened when the steering shaft is unlocked. The device also uses a relay switch having a solenoid coil to control energization of the alarm; in addition, at least three mechanical switches are required for operation of the device.

SUMMARY OF THE INVENTION

The instant invention provides improved signaling apparatus useful in a motor vehicle. Such a vehicle can include an ignition switch, a door, and key-operated locking means for the ignition switch. The apparatus of the invention comprises, in combination:

(1) A first electrical switch movable between open and closed positions upon insertion and removal of the key for the locking means; preferably, the electrical switch comprises a lever which is a part in the locking means and constitutes a movable contact operable relative to a stationary contact to open and close the switch, and one extremity of the lever is operable to urge a wedge toward contact with a seat for the key when the key is not in the seat;

(2) a power source, for example the battery of the vehicle;

(3) an electric circuit, which is energized by the power source when the first switch is in the open position and de-energized when the switch is in the closed position; the circuit comprises a resistor, a diode and a transistor; preferably the first switch and the resistor are electrically connected to the transistor through the diode; the collector of the transistor is electrically connected to the power source and the emitter of the transistor is electrically connected to ground;

(4) signaling means, preferably a light or sound-producing device, energizable by the electric circuit; and (5) a second electrical switch, operatively associated to ground the signaling means, which is movable to a closed position in which the signaling means is grounded and operable, preferably when a door of the vehicle is open, and movable to an open position in which the signaling means is ungrounded and inoperable, preferably when the vehicle door is closed; desirably, the second switch is operatively associated with additional electrical apparatus of the vehicle, for example, service lights thereof.

The present invention provides signaling apparatus which is of simple construction by comparison with much of the apparatus heretofore known, being advantageously operable without, for example, the use of numerous switches or relays. The apparatus of the invention also is reliable in service and comparatively economical to manufacture.

Accordingly, it is an object of the invention to provide signaling apparatus useful in a motor vehicle which includes an ignition switch, a door and key-operated locking means operatively associated with the ignition switch.

Other objects and advantages of the instant invention will be apparent from the following description, reference being made to the accompanying drawings.

DETAILED DESCRIPTION OF THE INVENTION

Figure 1:
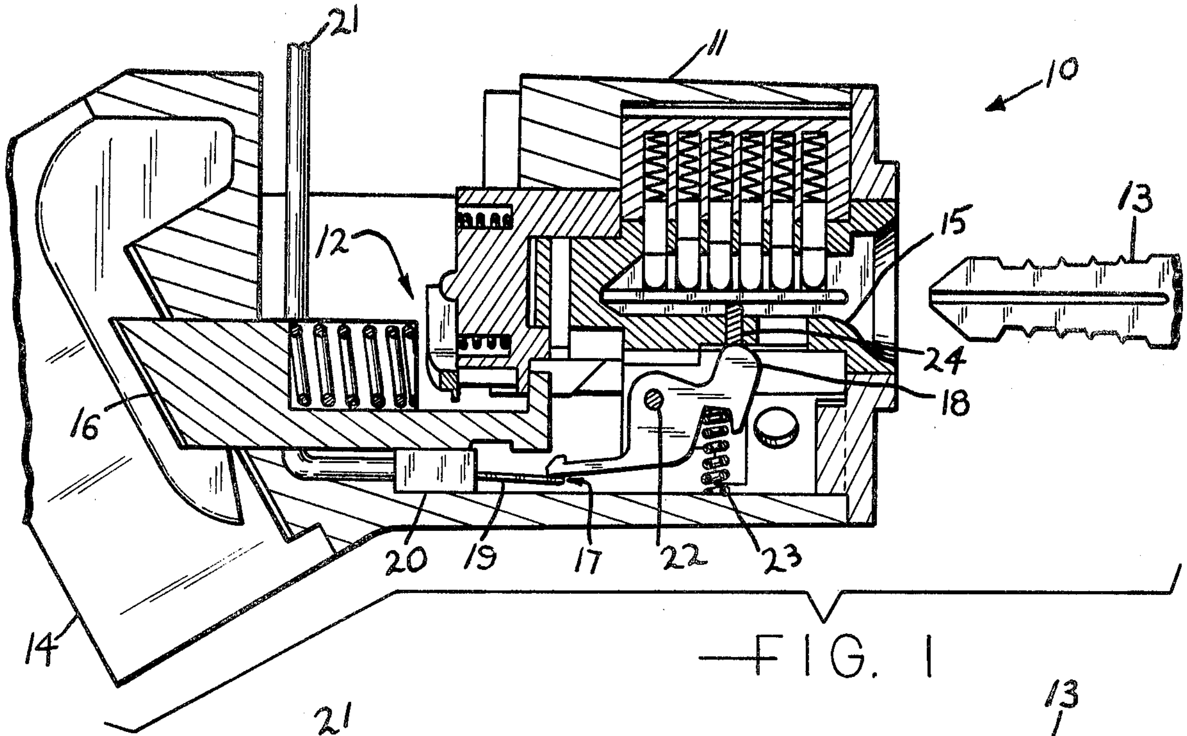
FIG. 1 is a partially-schematic view in longitudinal section of a largely conventional ignition switch assembly including the key-operated ignition and steering locking means, and showing a preferred embodiment of an operatively-associated first electrical switch, in a closed position, of signaling apparatus according to the invention.
Figure 2:
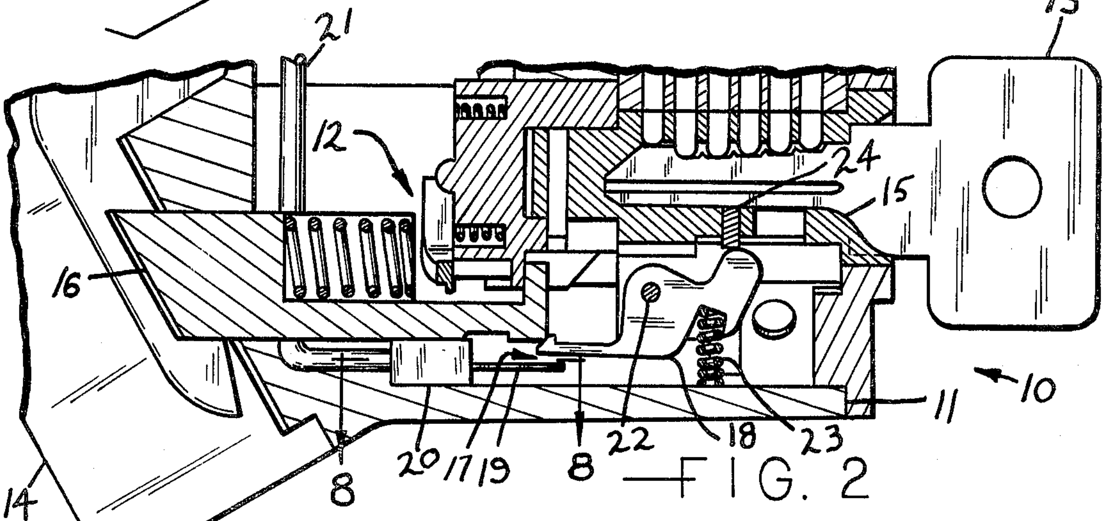
FIG. 2 is a fragmentary view similar to FIG. 1 showing the locking means in its STOP position with the key therein; the first switch is shown in its open position.
Figure 3:
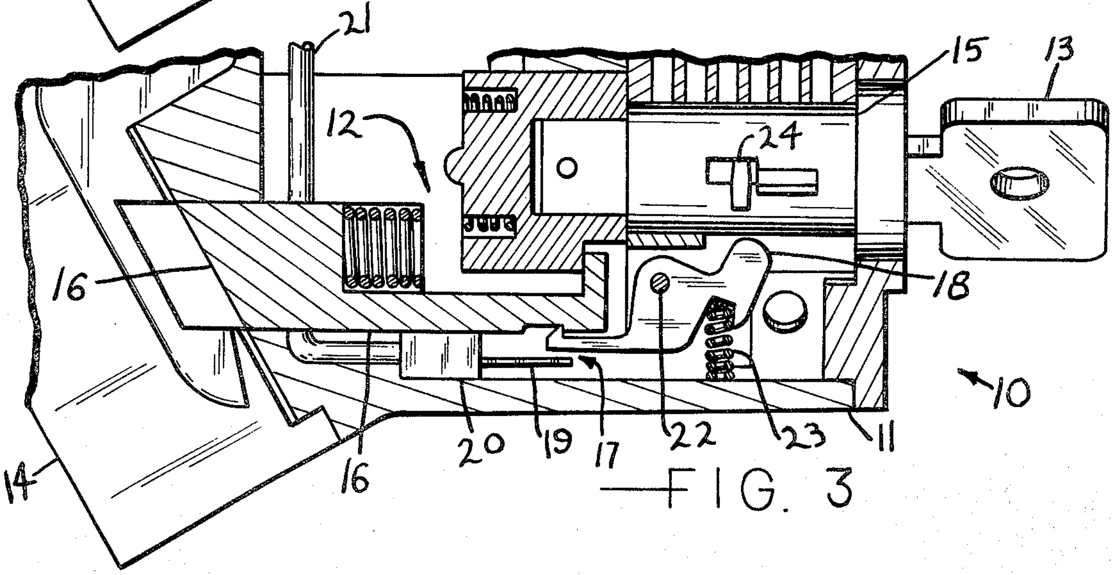
FIG. 3 is a fragmentary view similar to FIG. 2, but showing the locking means in the RUN position, and the first switch in its corresponding open position.

Referring now in more detail to FIGS. 1, 2 and 3, a largely-conventional ignition switch assembly for a motor vehicle, with signaling apparatus according to the instant invention operatively associated, is indicated generally at 10. The switch assembly 10 includes a steel housing 11 and locking means 12 operable by a key 13. A portion of the steering shaft of an associated motor vehicle (not shown) is indicated at 14; the locking means 12 includes a rotatable seat 15 for the key 13. The key 13, when inserted into the seat 15, prepares the switch assembly 10 to lock a spring-urged latching means 16 (FIG. 2) in a withdrawn position (FIG. 3) in which it does not lock the steering shaft 14 against rotation. When the key 13 is rotated in the seat 15 to the position shown in FIG. 3, the latching means 16 is withdrawn, as shown, to disengage the shaft 14. An electrical switch 17, which constitutes a first switch in operatively-associated signaling apparatus according to the invention (FIG. 10), is moved between a closed position (FIG. 1) and an open position (FIG. 2) as the key 13 is inserted into and removed from the seat 15. The switch 17 comprises a lever 18 and a stationary contact 19; the contact 19 is mounted in an insulator 20 in the housing 11 of the switch assembly 10. The stationary contact 19 is electrically-connected, inside the insulator 20, to an insulated wire 21. The lever 18 pivots on a pin 22 and is urged by a spring 23 toward contact with the seat 15. However, when the key 13 is in the seat 15, the lever 18 is forced away from the contact 19 first by a wedge 24 (FIG. 2). When the lever 18 is in the position shown in FIG. 1, the switch 17 is in a closed position while, when it is in the position shown in FIGS. 2 and 3, the switch 17 is in an open position. When the key 13 is rotated, the latching means 16 is withdrawn from the engaged position shown in FIGS. 1 and 2 and latched (FIG. 3) in the withdrawn position by the lever 18, which then is spaced from the contact 19 so that the switch 17 remains open.

Figure 4:
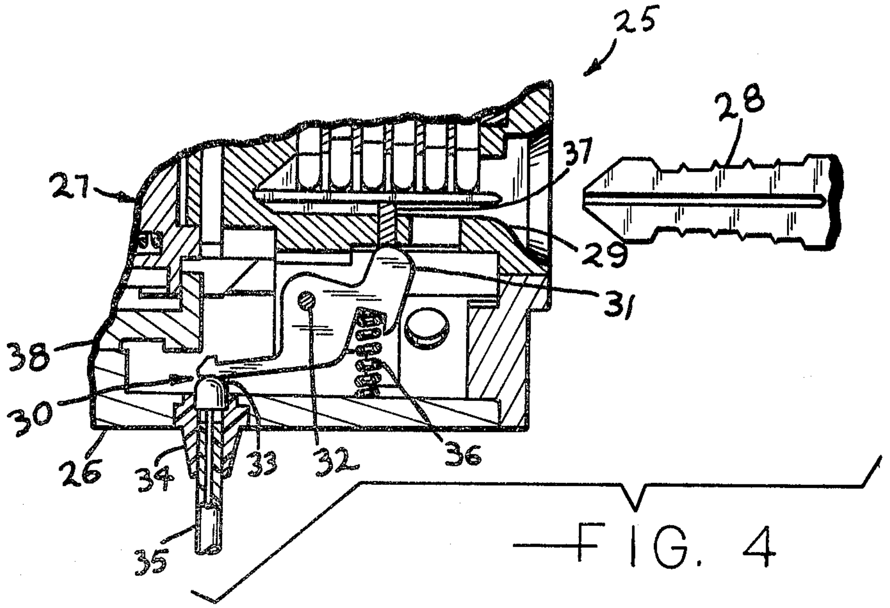
FIGS. 4, 5 and 6 are fragmentary views similar, respectively, to FIGS. 1, 2 and 3, of another embodiment of an ignition switch assembly and of another operatively-associated first electrical switch of signaling apparatus according to the invention, and showing the corresponding positions of the first switch in relation to the positions of the locking means.
Figure 5:
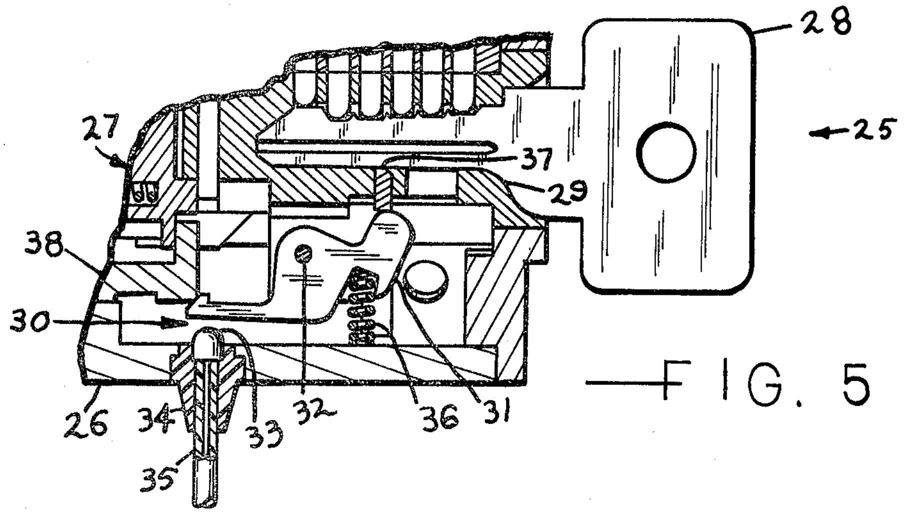
Figure 6:
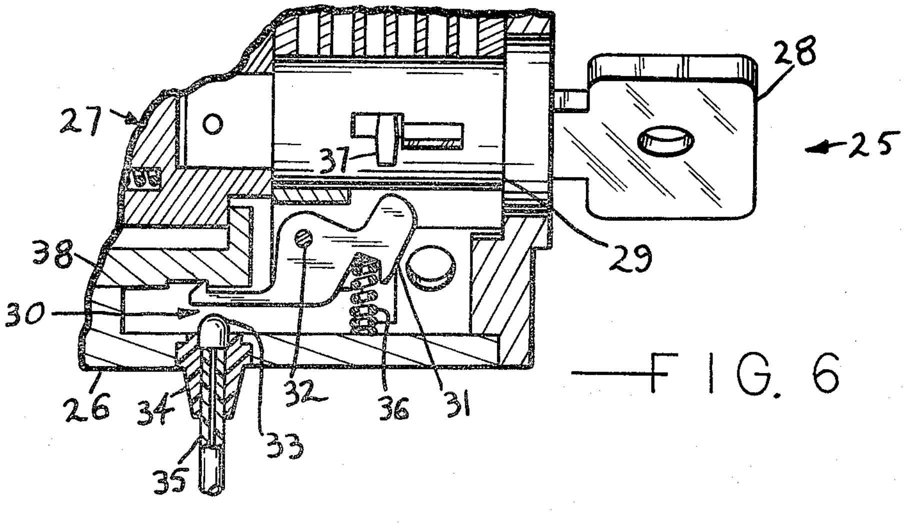
Figure 10:
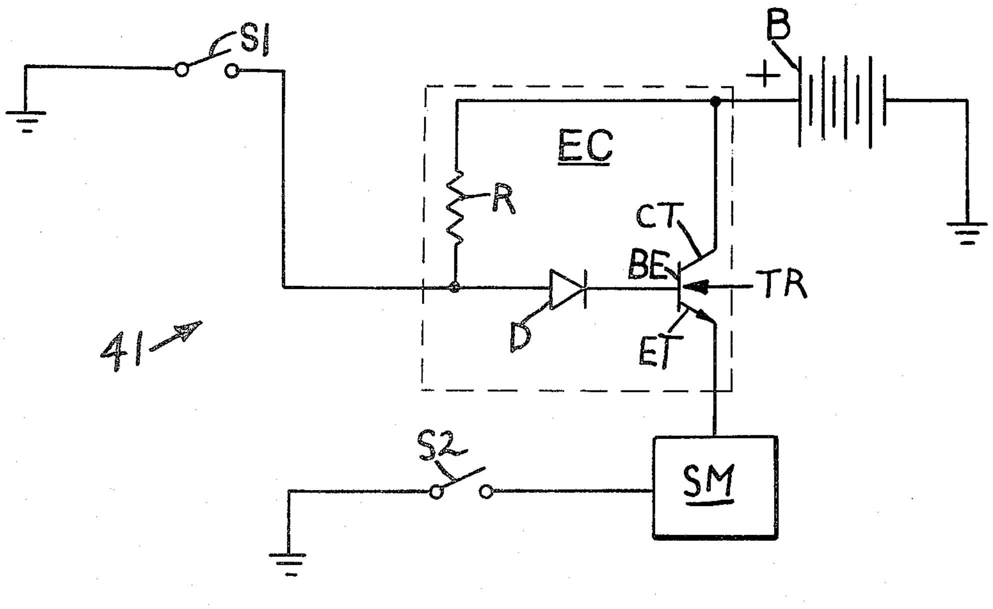
FIG. 10 is a schematic circuit diagram of a preferred embodiment of signaling apparatus according to the invention.

Referring in more detail to FIGS. 4, 5 and 6, a further embodiment of a largely-conventional ignition switch assembly for a motor vehicle, with signaling apparatus of the present invention operatively associated, is indicated generally at 25. The assembly 25 includes a steel housing 26 and locking means 27 operable by a key 28 to prevent or enable rotation of the steering shaft (not shown) of the vehicle, in a manner similar to that described above with reference to FIGS. 1, 2 and 3. The assembly 25 further includes a rotatable seat 29 for the key 28, and an electrical switch 30 which constitutes a first switch in operatively-associated signaling apparatus according to the invention (FIG. 10). The switch 30 comprises a lever 31, which pivots on a pin 32, and a stationary contact 33 mounted in an insulator 34 in the housing 26 of the switch assembly 25. The stationary contact 33 is electrically-connected, inside the insulator 34, to an insulated wire 35. When the key 28 is not in its seat 29, a spring 36 urges the lever 31 toward contact with the seat 29, thereby to move the switch 30 to a closed position in which the lever 31 is in contact with the stationary contact 33 (FIG. 4). However, when the key 28 is inserted in the seat 29, the lever 31 is forced away from the contact 33 first by a wedge 37 (FIG. 5), thereby moving the switch 30 to an open position. When the key 28 is rotated, a portion of a latching means 38 operatively associated with the locking means 27 is withdrawn from an engaged position in which it prevents rotation of the steering column of the vehicle and is latched in the withdrawn position (FIG. 6) by the lever 31, which then is spaced from the contact 33 so that the switch 30 remains open.

Figure 7:
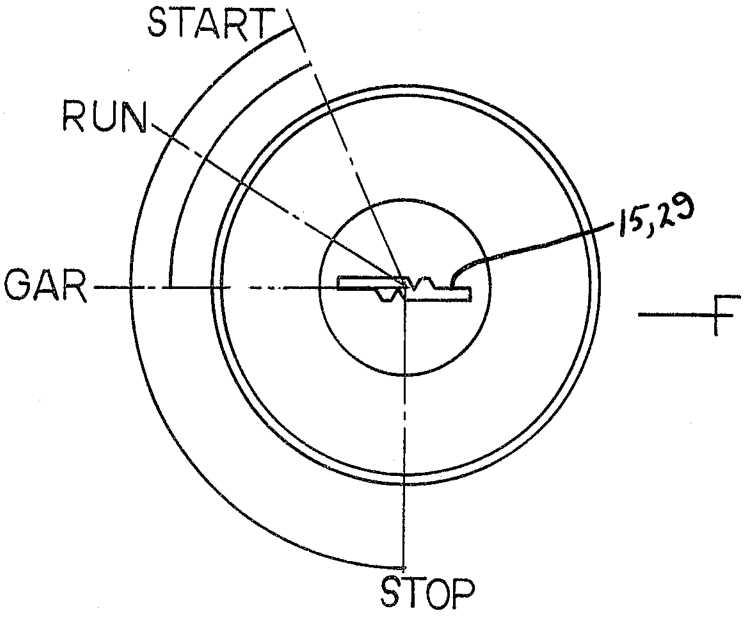
FIG. 7 is a schematic view showing four angular positions which the locking means illustrated in FIGS. 1-6 can assume.

Referring now to FIG. 7, four possible angular positions are shown for the keys 13 and 28 of the locking means 12 and 27 of FIGS. 1-3 and 4-6, respectively. The key seat 15 or 29 is illustrated in the GARAGE position; however, when the key 13 or 28 is inserted in the seat 15 or 29, and rotated therein (FIGS. 2-3, 5-6), the seat 15 or 29 can assume a STOP position (FIGS. 2 and 5), a RUN position (FIGS. 3 and 6) or a START position. In the largely conventional ignition switch assemblies 10 and 25 shown in FIGS. 1-6, which include key-operated locking means 12 and 27, a key rotated to the START position will automatically return to the RUN position when the key is released. The operation of the ignition system and steering shaft of the vehicle at each of these angular positions is as has been previously described with reference to conventional ignition switch/steering lock assemblies.

Figure 8:
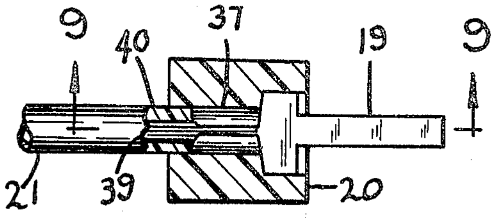
FIG. 8 is a partially-sectioned top view, taken along line 8—8 of FIG. 2, and enlarged to show details of construction, of a preferred contact of the first switch of signaling apparatus according to the invention.
Figure 9:
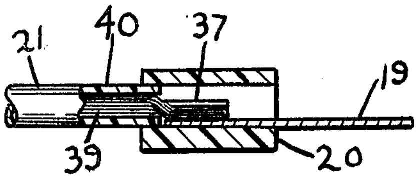
FIG. 9 is a partially-sectioned longitudinal view taken along the line 9—9 of FIG. 8.

Details of construction of the stationary contact 19 in the electrical switch 17 shown in FIGS. 1-3, and of associated structures, are shown in FIGS. 8 and 9. The copper contact 19 is mounted in the rubber insulator 20 and is held in electrical connection with the copper wire 21 by a crimp terminal 37. The wire 21 consists of twisted strands as indicated at 39; insulation 40 covers the strands 39.

Referring now to FIG. 10, signaling apparatus according to the invention is indicated generally at 41. The apparatus 41 comprises a first electrical switch S1, which can be, for example, either of the switches 17 or 30 shown and described with reference to FIGS. 1-6, a 12-volt storage battery B providing a power source, an electric circuit EC, indicated within the dotted line, signaling means SM and a second electrical switch S2. The switch S2 is operatively associated with a door of a motor vehicle (not shown), and is a conventional, plunger-type, two-pole switch mounted on the body of the vehicle and operable so that when the door is opened, the plunger is depressed, thereby closing the switch. The signaling means SM comprises a light and buzzer (¼ ampere total operating current mounted under the instrument panel (not shown) of the vehicle. The electric circuit EC comprises a ceramic resistor R (22K ohms), a diode D (0.005 ampere at 12 volts) and a transistor TR (type NPN, output of about ¼ ampere). The circuit EC is energizable by the battery B, the signaling means SM is energizable by the circuit EC; the negative terminal of the battery B is electrically-connected to ground (the chassis, not shown, of the motor vehicle); the positive terminal thereof is electrically-connected to the collector CT of the transistor TR and to one end of the resistor R. The other end of the resistor R is electrically-connected to one pole of the switch S1, while the other pole of the switch S1 is electrically-connected to ground (the chassis, not shown, of the motor vehicle). The switch S1 can be, in a particular case, the first switch 17 (FIGS. 1–3); the pole of the switch S1 connected to ground, in the particular case, is the movable contact 18, and the pole connected by means of the wire 21 to one end of the resistor R is the stationary contact 19. The end of the resistor R connected to one pole of the switch S1 is also electrically-connected to the diode D; the other end of the diode D is electrically-connected to the base BE of the transistor TR so that when the diode D is forward-biased, the direction of current flow is therethrough to the base BE of the transistor TR. The emitter ET of the transistor TR is electrically-connected to the signaling means SM; the means SM is electrically-connected, in series, to one pole of the switch S2. The remaining pole of the switch S2 is electrically-connected to ground (the chassis, not shown, of the motor vehicle). The switch S2 is, in the particular case described above, operable upon opening or closing of a vehicle door (not shown); it is closed when the door is open, and open when the door is closed.

When the switch S1 is open (FIGS. 2 and 3), and the switch S2 is closed, for example when the key 13 is inserted in the locking means 12 and an operatively-associated door of the vehicle is open, the electric circuit EC becomes energized by the battery B. The circuit EC, consequently, energizes the signaling means SM. Electrical current supplied by the battery B flows from the positive terminal thereof through the resistor R and to the diode D. The diode D, forward-biased by the current flow, commences to conduct current to the base BE of the transistor TR, where the current is amplified. The amplified current, approximately ¼ ampere, flows from the emitter ET of the transistor TR to energize the signaling means SM, activating the light and buzzer.

When the switch S1 is closed (FIG. 1), for example when the key 13 is not inserted in the locking means 12, and the switch S2 is closed because the door of the vehicle is open, electrical current supplied by the battery B is short-circuited to ground through the resistor R and the switch S1. The diode D in this case is reverse-biased, a non-conducting element, so that current cannot flow to the base BE of the transistor TR and the signaling means SM is not energized thereby. However, when the switches S1 and S2 are so positioned, the electric current, I, to ground through the switches S1 is negligible, equaling:

$$I\text{ (amperes)} = \frac{\text{voltage of the power source (battery } B)}{\text{resistance of the electrical circuit (resistor } R)}$$

The current (I), where voltage=12 volts, resistance=2.2K ohms, is 12/2200 or 0.005 ampere. It is apparent that this value is negligible by comparison with the approximately ¼ ampere output current produced by the circuit EC and needed for energization of the light and buzzer signaling means SM described above. The 0.005 ampere current drain on the battery B corresponds, for example, to substantially the amount of current drain on a 12-volt battery which is required for operation of a typical electric clock in a motor vehicle. Accordingly, when the signaling apparatus of the invention is grounded through the switch S1 and therefore not operable, as in the case where the key 13 has been removed from the locking means 12 before a door of the vehicle is opened, the battery B of the vehicle will not be appreciably discharged over short periods of time when, for example, the vehicle is not being operated.

When the switch S1 is closed (FIG. 1) and the switch S2 is open, for example when the key 13 is not inserted in the locking means 12 and an operatively-associated door of the vehicle is closed, the signaling means SM is not energized by the circuit EC. In this case the transistor TR, the diode D and the signaling means SM do not receive current because there is an open circuit from the battery B, through the resistor R and switch S1 to ground. The value of the electrical current through switch S1 to ground is, in this case, equal to I according to the foregoing equation. Also, when the switch S1 is open (FIGS. 2 and 3) and the switch S2 is open, for example when the motor vehicle is being operated normally with the key 13 inserted in the locking means 12, and an operatively-associated door of the vehicle closed, the signaling means SM is not energized. In this latter case the circuit EC is inoperable because electric current cannot flow from the battery B through either of the switches S1 or S2; there is no current drain on the battery B attributable to the signaling apparatus.

It will be appreciated that the signaling apparatus provided by the invention is useful in the motor vehicles for operative association with ignition switch assemblies including numerous suitable key-operated locking means, and is therefore not limited in application solely to the largely-conventional steering lock/ignition switch assemblies illustrated in the drawings and described herein. For example, U.S. Pat. No. 3,840,714 discloses another such assembly with which the present invention can be operatively associated. Because a particularly advantageous feature of the present invention involves the utilization of electronic components in an electric circuit rather than moving parts as heretofore known, it is not crucial to the practice of the invention that an associated key-operated mechanism have any particular mechanical, structural or functional configuration so long as insertion and removal of the key causes opening and closing of the first switch of associated signaling apparatus of the invention, thereby controlling energization or de-energization of the apparatus.

From the foregoing description, it is apparent that signaling apparatus according to the invention is especially useful to provide a warning signal when a driver or passenger opens a door of a motor vehicle while an ignition key remains in its steering lock device. It will be appreciated, however, that this apparatus can be situated in a motor vehicle so as to provide a similar warning upon opening or movement of the hood or trunk, or other functional equipment of the vehicle. The latter is possible because the second switch (S2, FIG. 10) can be placed in any of many locations within the vehicle so that it is actuated by opening or movement of the hood or the like. Accordingly, the foregoing description, including the discussion in reference to FIGS. 1–3, and 7–10 of the drawings, of the best presently contemplated mode is not to be construed as a limitation thereon.

It will also be appreciated that signaling apparatus according to the invention can operate any suitable signaling means in a vehicle, instead of or in addition to the light or buzzer shown and described. For example, service lights of the vehicle or instruments and accessories thereof can be operated. Furthermore, the switch S2 (FIG. 10) can, additionally, be operatively associated with electrical apparatus of a motor vehicle other than signaling apparatus so as to energize and de-energize both the signaling apparatus and the other electrical apparatus when the switch S2 is moved between open and closed positions.

The power source illustrated in FIG. 10 is preferably, as described herein, a 12 volt storage battery because such batteries are commonly used in motor vehicles. However, any other source of power can be used so long as it supplies sufficient current at an appropriate voltage to energize the electric circuit of the invention.

It will be appreciated that the electric circuit specified herein is not limited to the details of construction shown and described. For example, if such a circuit is to be used with signaling means requiring higher input voltages or currents than the buzzer and light described, a transistor of higher output than that specified can be substituted, and other components having different electrical characteristics from those described can be used accordingly to accommodate the electrical characteristics of the particular transistor. Numerous suitable conventional electrical components which are suitable for use in the invention will be apparent to persons skilled in the art.

It is contemplated that switches having a plurality of poles or gangs, or having various constructions different from that of the particular switches described herein, can be used in signaling apparatus according to the invention. For example, the switch S1 (FIG. 10) can consist of a switch external to the housing of an ignition switch assembly rather than integral therewith; the contacts thereof can be either movable or stationary, or not a part of a locking mechanism as previously described. However, whatever construction is selected for the switches and other components of signaling apparatus according to the invention, reliability of the apparatus is of paramount importance. In the preferred embodiments described above, reliability is particularly enhanced by the use of stationary electrical contacts and the electric circuit containing electronic rather than electro-mechanical devices. By comparison with conventional signaling apparatus, the apparatus of the invention, using such components, does not require expensive elements such as relays or the like which can be subject to excessive and premature wear in service, correspondingly decreasing the reliability of the apparatus.

It will be apparent that this invention is not to be limited to the specific details shown and described, and that various changes and modifications can be made from the specific disclosure hereof without departing from the spirit and scope of the invention as defined in the following claims.

What I claim is:

1. In a motor vehicle including an ignition switch, a door for entry into and exit from the vehicle, and key-operated locking means operatively associated with the ignition switch, improved signaling apparatus comprising, in combination, a first electrical switch movable between open and closed positions upon insertion of the key into and removal thereof from the locking means, a power source, a resistor, a diode and a transistor having a base, an emitter and a collector, signaling means, a second electrical switch movable between open and closed positions, a first electrical circuit connecting said power source through said resistor and said first switch to ground, a second electrical circuit connecting said power source through the collector and the emitter of said transistor, said signal means and said second switch to ground, and a third electrical circuit connecting said first electrical circuit through said diode to the base of said transistor; said resistor, said diode and said transistor being operably connected in said circuit so that (1) when said first electrical switch is in its closed position, said transistor prevents said signaling means from being energized; while (2) when said first electrical switch is in its open position, said transistor is operable to enable the energizing of said signaling means, whereby, when said first electrical switch is in its open position, said signal means is energized when said second switch is closed, and is not energized when said second switch is open.

2. The apparatus claimed in claim 1, wherein said first switch has a stationary contact and a movable contact.

3. The apparatus claimed in claim 2, wherein said movable contact is operable relative to said stationary contact to open and close said first switch upon insertion and removal of the key.

4. The apparatus claimed in claim 2, wherein said movable contact further comprises a part in the locking means.

5. The apparatus claimed in claim 2, wherein said movable contact further comprises a lever, and the locking means further comprises a wedge and a seat for the key, and wherein one extremity of said lever is operable, when the key is not in said seat, to urge said wedge toward contact with said seat.

6. The apparatus claimed in claim 1, wherein, additionally, said second switch is operable to control energization of electrical apparatus of the motor vehicle.

7. The apparatus claimed in claim 6, wherein said electrical apparatus comprises service lights of a motor vehicle.

8. The apparatus claimed in claim 1, wherein said second switch is further operatively associated with the door of the vehicle, so as to be movable between open and closed positions upon opening and closing of the door.

9. The apparatus claimed in claim 8 wherein said second switch is closed when the door is open and open when the door is closed.

10. The apparatus claimed in any of claims 1–9, wherein said first switch and said resistor are electrically-connected to the base of said transistor through said diode, the collector of said transistor is electrically-connected to the power source and the emitter of said transistor is electrically-connected to ground through said signaling means and said second switch.

11. The apparatus claimed in any of claims 1–9, wherein said signaling means is a light.

12. The apparatus claimed in any of claims 1–9, wherein said signaling means is operable to generate an audible signal.

* * * * *